US010094025B2

(12) United States Patent
Minaki et al.

(10) Patent No.: US 10,094,025 B2
(45) Date of Patent: Oct. 9, 2018

(54) MECHANICAL COMPONENT FOR INTERNAL COMBUSTION ENGINE, MANUFACTURING METHOD OF MECHANICAL COMPONENT FOR INTERNAL COMBUSTION ENGINE, AND MECHANICAL COMPONENT

(71) Applicant: Aisin Seiki Kabushiki Kaisha, Kariya-shi (JP)

(72) Inventors: Hajime Minaki, Nagoya (JP); Hiroaki Sasayama, Nagoya (JP); Akihiro Okamoto, Nishio (JP); Takuya Niimi, Handa (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/614,014

(22) Filed: Jun. 5, 2017

(65) Prior Publication Data

US 2017/0268109 A1 Sep. 21, 2017

Related U.S. Application Data

(63) Continuation of application No. 14/287,423, filed on May 27, 2014.

(30) Foreign Application Priority Data

May 27, 2013 (JP) ................................ 2013-110940

(51) Int. Cl.
*B23P 15/10* (2006.01)
*F02F 3/00* (2006.01)
(Continued)

(52) U.S. Cl.
CPC ...... *C23C 18/1806* (2013.01); *C23C 18/1692* (2013.01); *C23C 18/32* (2013.01);
(Continued)

(58) Field of Classification Search
CPC ........ F05C 2201/021; F05C 2201/0448; F02F 3/22; B23P 15/10; B21K 1/18
(Continued)

(56) References Cited

U.S. PATENT DOCUMENTS 2,575,214 A * 11/1951 Garland ..................... F16J 9/22
134/3
3,583,290 A * 6/1971 Briggs .................... F02B 77/02
92/158
(Continued)

FOREIGN PATENT DOCUMENTS

JP 62-270868 A 11/1987
JP 2-38593 A 2/1990
(Continued)

OTHER PUBLICATIONS

Office Action dated Jan. 10, 2017 in Japanese Patent Application No. 2013-110940.

*Primary Examiner* — Syed O Hasan
(74) *Attorney, Agent, or Firm* — Oblon, McClelland, Maier & Neustadt, L.L.P.

(57) ABSTRACT

A mechanical component for an internal combustion engine includes a mechanical component body made of one of aluminum and aluminum alloy and used for the internal combustion engine, a nickel plating layer formed to cover a surface of a predetermined portion of the mechanical component body, and a reforming layer formed between the surface of the predetermined portion of the mechanical component body and the nickel plating layer.

4 Claims, 3 Drawing Sheets

(51) Int. Cl.

| | |
|---|---|
| ***C23C 18/18*** | (2006.01) |
| ***C23C 18/16*** | (2006.01) |
| ***C23C 18/32*** | (2006.01) |
| *F02F 3/10* | (2006.01) |

(52) U.S. Cl.
CPC ........... *F02F 3/10* (2013.01); *Y10T 428/1275* (2015.01); *Y10T 428/12389* (2015.01)

(58) Field of Classification Search
USPC ...... 123/193.6; 29/888.04, 888.042, 888.044
See application file for complete search history.

(56) References Cited

U.S. PATENT DOCUMENTS

| | | | | |
|---|---|---|---|---|
| 5,371,944 | A * | 12/1994 | Guenther ............ | F02B 23/0603 123/669 |
| 5,477,820 | A * | 12/1995 | Rao ......................... | F02B 77/11 123/193.2 |
| 5,897,965 | A | 4/1999 | Itoh et al. | |
| 8,231,741 | B2 | 7/2012 | Fujiwara et al. | |
| 8,757,124 | B2 * | 6/2014 | Hoeg ........................ | B22F 3/15 123/188.3 |
| 2009/0266331 | A1 * | 10/2009 | Ando ....................... | C21D 7/06 123/193.6 |

FOREIGN PATENT DOCUMENTS

| | | | |
|---|---|---|---|
| JP | 5-86443 | | 4/1993 |
| JP | 05-086482 | A | 4/1993 |
| JP | 6-213070 | A | 8/1994 |
| JP | 8-158058 | | 6/1996 |
| JP | 2007-169754 | | 7/2007 |
| JP | 2011-52322 | | 3/2011 |

* cited by examiner

[Hardness distribution measurement result]

[Elemental analysis by FE-SEM/EDX]

| | Nickel plating layer | | | Reforming layer | | | Aluminum alloy layer | | |
|---|---|---|---|---|---|---|---|---|---|
| Position | 1 | 2 | 3 | 1 | 2 | 3 | 1 | 2 | 3 |
| O | | | | 7.2 | 4.5 | 3.6 | | | |
| Al | 0.7 | 0.8 | 0.9 | 68.5 | 56.6 | 66.2 | 97.8 | 96.8 | 98.0 |
| Si | | | | 6.7 | 6.4 | 13.7 | 1.4 | 1.8 | 1.3 |
| P | 11.8 | 11.9 | 12.8 | | | | | | |
| Ni | 87.5 | 87.3 | 86.3 | 11.5 | 16.7 | 8.3 | | | |
| Cu | | | | 6.1 | 15.8 | 8.2 | 0.8 | 1.3 | 0.8 |
| Total | 100.0 | 100.0 | 100.0 | 100.0 | 100.0 | 100.0 | 100.0 | 100.0 | 100.0 |

(wt%)

MECHANICAL COMPONENT FOR INTERNAL COMBUSTION ENGINE, MANUFACTURING METHOD OF MECHANICAL COMPONENT FOR INTERNAL COMBUSTION ENGINE, AND MECHANICAL COMPONENT

CROSS REFERENCE TO RELATED APPLICATIONS

This application is a continuation of U.S. application Ser. No. 14/287,423, filed May 27, 2014, which is based on and claims priority under 35 U.S.C. § 119 to Japanese Patent Application 2013-110940, filed on May 27, 2013, the entire content of each are incorporated herein by reference.

TECHNICAL FIELD

This disclosure generally relates to a mechanical component for an internal combustion engine, a manufacturing method of the mechanical component for the internal combustion engine, and a mechanical component.

BACKGROUND DISCUSSION

A mechanical component for an internal combustion engine including a mechanical component body that is made of aluminum or aluminum alloy, a manufacturing method of the mechanical component for the internal combustion engine, and a mechanical component including a mechanical component body that is made of aluminum or aluminum alloy are known, for example, as disclosed in JP08-158058A, which will be hereinafter referred to as Reference 1.

According to a mechanical component disclosed in Reference 1, an electroless nickel plating that includes phosphorus and boron is coated on a surface of a base material (i.e., a mechanical component body of the mechanical component) which is made of aluminum alloy, and then heat treatment is performed on the base material and the electroless nickel plating at a low temperature, for example, 200° C., so that a Vickers hardness of the electroless nickel plating is equalized to 800 HV or greater. In the mechanical component disclosed in Reference 1, because of the heat treatment at a low temperature, hardness of the electroless nickel plating is enhanced while hardness of the base material made of aluminum alloy is restrained from decreasing.

Nevertheless, in a case where the mechanical component disclosed in Reference 1 is placed under a high temperature environment, for example, at approximately 250° C. or more, hardness of aluminum alloy that constitutes the base material is reduced. Hardness difference between the electroless nickel plating of which hardness increases and the aluminum alloy of which hardness decreases becomes greater, which may result in easy peeling of the electroless nickel plating from the base material. Generally, in a case where the electroless nickel plating is coated on the surface of the base material made of aluminum alloy, a pre-process is performed. Specifically, the pre-process includes an etching process for causing the surface of the base material to be roughened so as to form an uneven surface, and a zinc immersion process for forming zinc plating which is replaceable with nickel. In the base material after the pre-process is conducted, a defect caused by corrosion at the surface, for example, may occur. Thus, in a case where the electroless nickel plating is peeled off from the base material, a crack may initiate at the aforementioned defect portion of the surface of the base material that is exposed because of the peeling of the electroless nickel plating. As a result, the mechanical component may be damaged from the portion at which the base material is exposed.

A need thus exists for a mechanical component for an internal combustion engine, a manufacturing method of the mechanical component for the internal combustion engine, and a mechanical component which are not susceptible to the drawback mentioned above.

SUMMARY

According to an aspect of this disclosure, a mechanical component for an internal combustion engine includes a mechanical component body made of one of aluminum and aluminum alloy and used for the internal combustion engine, a nickel plating layer formed to cover a surface of a predetermined portion of the mechanical component body, and a reforming layer formed between the surface of the predetermined portion of the mechanical component body and the nickel plating layer.

According to another aspect of this disclosure, a manufacturing method of a mechanical component for an internal combustion engine, the manufacturing method includes steps of forming a reforming layer on a surface of a predetermined portion of a mechanical component body that is made of one of aluminum and aluminum alloy by a shot peening process performed on the surface of the predetermined portion of the mechanical component body, and forming a nickel plating layer to cover the surface of the predetermined portion of the mechanical component body at which the reforming layer is formed.

According to a further aspect of this disclosure, a mechanical component includes a mechanical component body made of one of aluminum and aluminum alloy, a nickel plating layer formed to cover a surface of a predetermined portion of the mechanical component body, and a reforming layer formed between the surface of the predetermined portion of the mechanical component body and the nickel plating layer.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment will be explained with reference to the attached drawings. First, configurations of a piston 100 according to the embodiment will be explained with reference to FIGS. 1 to 3. The piston 100 is an example of a mechanical component for an internal combustion engine and an example of a mechanical component.

Figure 1:
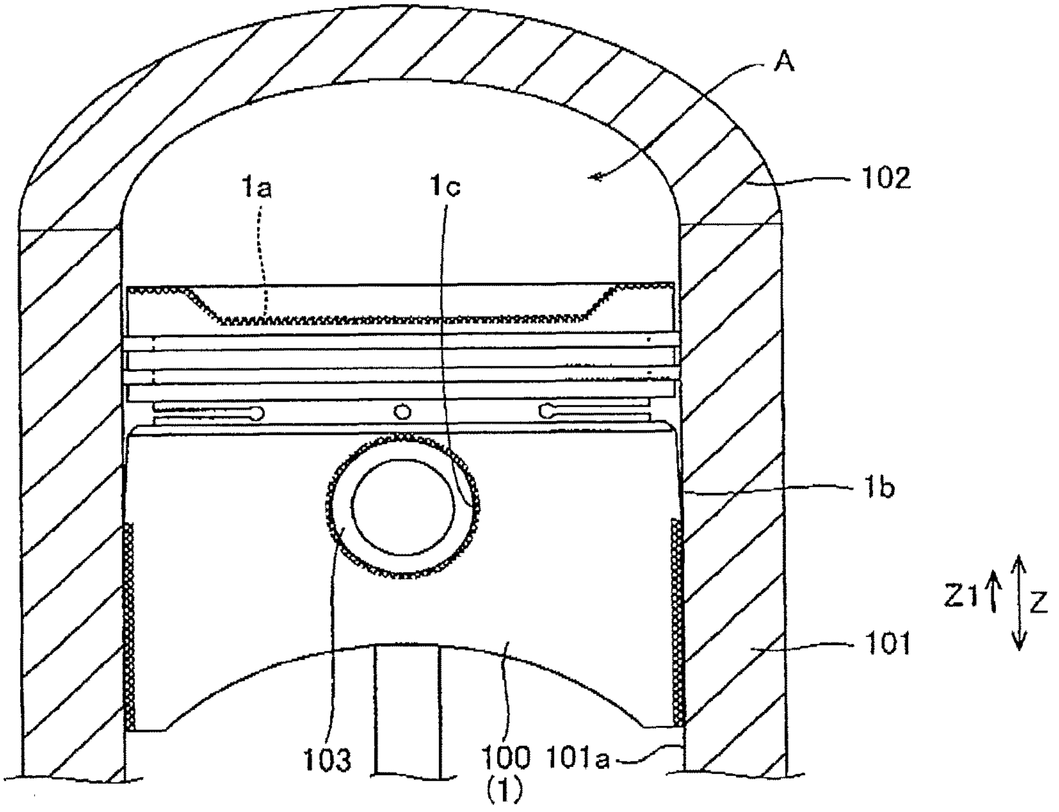
FIG. 1 is a side view schematically illustrating a periphery of a piston according to an embodiment disclosed here.

Specifically, the piston 100 is the mechanical component used for the internal combustion engine (i.e., an engine) of a vehicle. As illustrated in FIG. 1, the piston 100 is disposed within a cylinder 101 to be movable in an up-down direction corresponding to a direction Z in FIG. 1. A cylinder head 102 is disposed at an upper portion of the cylinder 101, i.e., at a side of Z1 in FIG. 1. A combustion chamber A is formed at an area surrounded by the piston 100, the cylinder 101, and the cylinder head 102. In the combustion chamber A, air-fuel mixture suctioned to the combustion chamber A is burnt to generate a combustion pressure equal to or greater than approximately 6 MPa and a combustion gas of which temperature is equal to or greater than approximately 1800° C. Thus, a top surface 1*a* of a piston body 1 of the piston 100 positioned to face the combustion chamber A is applied with a large combustion pressure as stress. In addition, because a temperature of the top surface 1*a* becomes equal to or greater than approximately 250° C. (i.e., around 300° C.), the top surface 1*a* of the piston body 1 (which is indicated by a half-tone dot meshing portion in FIG. 1) needs and includes high strength (hardness) in a state to be arranged under a high temperature environment equal to or greater than approximately 250° C. The piston body 1 is an example of a mechanical component body and the top surface 1*a* is an example of a surface of a predetermined portion.

A sliding surface (i.e., an outer surface) 1*b* of the piston body 1 relative to a cylinder inner surface 101*a* and an inner peripheral surface for a piston pin, which will be hereinafter simply referred to as an inner peripheral surface 1*c* into which a piston pin 103 is inserted are also arranged under the high temperature environment equal to or greater than approximately 250° C. because of heat from the top surface 1*a* of the piston body 1 and friction heat generation, for example. The sliding surface 1*b* and the inner peripheral surface 1*c* of the piston body 1 are indicated by half-tone dot meshing portions, respectively, in FIG. 1. In addition, the sliding surface 1*b* and the inner peripheral surface 1*c* serve as sliding surfaces relative to the cylinder inner surface 101*a* and the piston pin 103, respectively, and thus needs and includes high strength (hardness). Each of the sliding surface 1*b* and the inner peripheral surface 1*c* is an example of the surface of the predetermined portion.

The piston body 1 is made of Al—Si—Cu alloy (aluminum alloy) and formed by casting. Thus, as compared to a case where the piston body 1 is obtained by cast iron, the piston 100 may be lightened. The other members than the piston 100 in the engine, i.e., a connecting rod and a flywheel, for example, each weight of such members being adjusted on a basis of the weight of the piston 100, may be lightened. The engine as a hole may be lightened accordingly. The piston body 1 may be made of one of aluminum and aluminum alloy.

Figure 2:
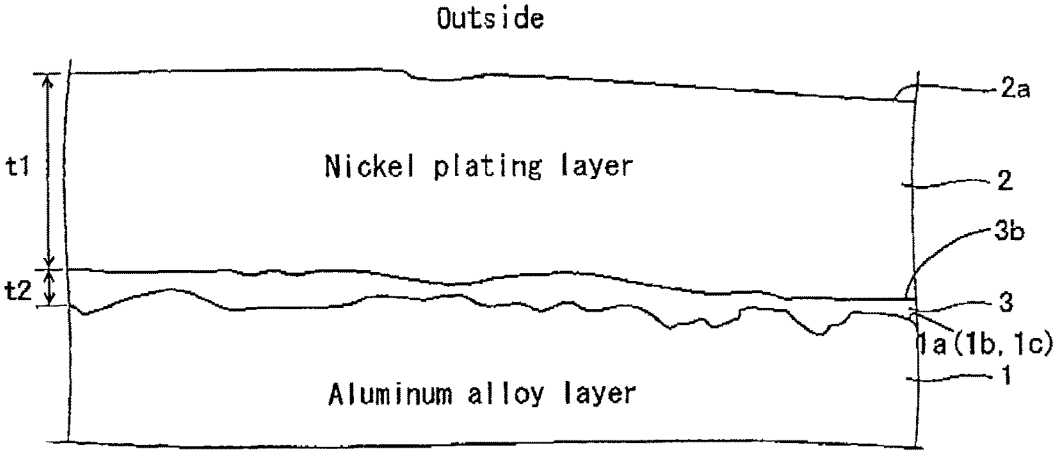
FIG. 2 is a cross-sectional view illustrating a layer structure at a top surface, a sliding surface, and an inner peripheral surface of the piston according to the embodiment.

As illustrated in FIG. 2, a nickel plating layer 2 is formed to cover the top surface 1*a*, the sliding surface 1*b*, and the inner peripheral surface 1*c* of the piston body 1. In addition, a reforming layer 3 is formed between the nickel plating layer 2, and each of the top surface 1*a*, the sliding surface 1*b* and the inner peripheral surface 1*c*. That is, the piston body 1 made of aluminum alloy (Al—Si—Cu alloy) serving as an aluminum alloy layer, the reforming layer 3, and the nickel plating layer 2 are laminated in the mentioned order at the top surface 1*a*, the sliding surface 1*b*, and the inner peripheral surface 1*c*.

The nickel plating layer 2 is made of Ni—P alloy including nickel (Ni) in a range of approximately 85 wt % to approximately 96 wt % and phosphorus (P) in a range of approximately 4 wt % to approximately 15 wt %. The nickel plating layer 2 is formed by an electroless nickel plating process. A thickness t1 of the nickel plating layer 2 serving as an average thickness thereof is approximately 20 μm.

A surface 2*a* of the nickel plating layer 2 that is exposed to the outside thereof is formed to be smooth (i.e., a smooth surface). Thus, as being different from a case where the surface 2*a* is formed to be rough in a concavo-convex form (i.e., formed in a rough surface or an uneven surface), for example, a possible defect such as a crack initiation from a concave-convex portion of the rough surface, for example, of the piston 100 may be restrained.

Figure 3:
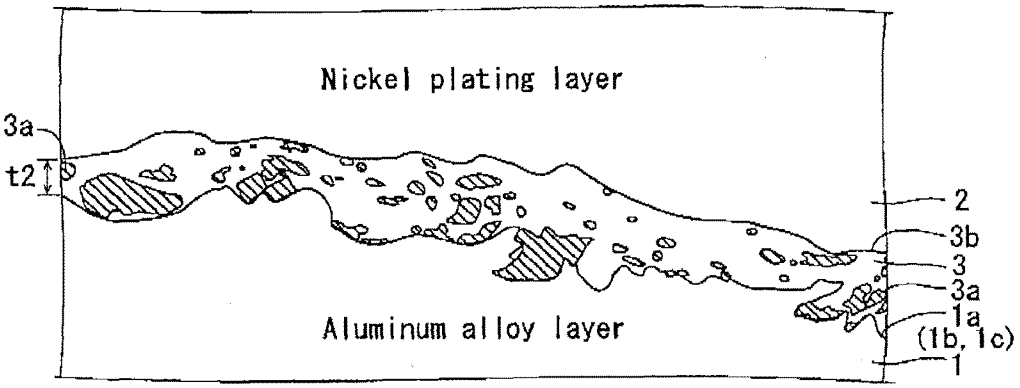
FIG. 3 is an enlarged cross-sectional view illustrating the layer structure at the top surface, the sliding surface, and the inner peripheral surface of the piston according to the embodiment.

The reforming layer 3 is formed by reforming of Al—Si—Cu alloy (aluminum alloy) that is positioned at the top surface 1*a*, the sliding surface 1*b*, and the inner peripheral surface 1*c* by a fine particle shot peening process in which a blast material including nickel fine particles is used. Accordingly, as illustrated in FIG. 3, the reforming layer 3 includes not only aluminum (Al), silicon (Si) and copper (Cu) but also nickel (Ni) embedded by the fine particle shot peening process and oxygen (O) embedded together with nickel (Ni). By the aforementioned five elements, i.e., Al, Si, Cu, Ni, and O, a composite structure 3*a* (which is indicated by shaded portions in FIG. 3) is formed within the reforming layer 3. A concentration (content rate) of Ni in the reforming layer 3 ranges from approximately 5 wt % to approximately 20 wt %. The aforementioned concentration is specified to be smaller than a concentration of Ni in the nickel plating layer 2 that ranges from approximately 85 wt % to approximately 96 wt %.

In the reforming layer 3, grain refinement of aluminum alloy is obtained. Thus, the reforming layer 3 formed by the composite structure 3*a* and the aluminum alloy where grain refinement is achieved includes characteristics so that hardness of the reforming layer 3 is unlikely to decrease (i.e., the reforming layer 3 is unlikely to be soften) by heat as compared to the aluminum alloy (i.e., the aluminum alloy layer) that forms the piston body 1.

A surface 3*b* of the reforming layer 3 that makes contact with the nickel plating layer 2 is formed to be rough in a concavo-convex form (i.e., a rough surface or an uneven surface), for example. Thus, as compared to a case where the surface 3*b* is not formed to be rough in the concavo-convex form, adhesion between the nickel plating layer 2 and the reforming layer 3 may improve. In addition, the reforming layer 3 is formed so that a thickness t2 thereof is uneven by the fine particle shot peening process. At this time, the thickness t2 ranges from approximately 3 μm to approximately 10 μm that is smaller than the thickness t1 of the nickel plating layer 2 (approximately 20 μm).

In a case where the piston 100 is arranged under a high temperature environment equal to or greater than approximately 250° C., for example, the aluminum alloy (the aluminum alloy layer) forming the piston body 1 is softened because of a release of residual stress. As a result, the Vickers hardness (HV) of each of the top surface 1*a*, the sliding surface 1*b*, and the inner peripheral surface 1*c* of the piston body 1 decreases from approximately 120 to approximately 60. On the other hand, the nickel plating layer 2 that is not sufficiently crystalized before being arranged under the high temperature environment is then substantially completely crystalized under the high temperature environment. Thus, the Vickers hardness (HV) of the nickel plating layer 2 increases from a range of approximately 500 to 600 to a range of approximately 800 to 1000. As a result, in a case where the piston body 1 is arranged under the high temperature range, hardness difference between the piston body 1 (the aluminum alloy layer) and the nickel plating layer 2 increases.

In the present embodiment, the reforming layer 3 includes characteristics where the hardness is unlikely to decrease (i.e., the reforming layer 3 is unlikely to be softened) by heat as compared to the aluminum alloy layer that forms the piston body 1. The Vickers hardness of the reforming layer 3 is thus substantially unchanged, i.e., in a range of approximately 200 HV to 400 HV. The Vickers hardness of the reforming layer 3 (200 HV to 400 HV) is greater than the Vickers hardness of each of the top surface 1*a*, the sliding surface 1*b* and the inner peripheral surface 1*c* made of aluminum alloy, i.e., approximately 120 HV before subjected to the high temperature environment and approximately 60 HV after subjected to the high temperature environment. In addition, the Vickers hardness of the reforming layer 3 is smaller than the Vickers hardness of the nickel plating layer 2, i.e., approximately 500 HV to 600 HV before subjected to the high temperature environment and approximately 800 HV to 1000 HV after subjected to the high temperature environment. Accordingly, the hardness difference between the reforming layer 3 and each of the top surface 1*a*, the sliding surface 1*b*, and the inner peripheral surface 1*c* and the hardness difference between the reforming layer 3 and the nickel plating layer 2 are both smaller than the hardness difference between the nickel plating layer 2 and each of the top surface 1*a*, the sliding surface 1*b*, and the inner peripheral surface 1*c*.

In the present embodiment, the reforming layer 3 disposed between the nickel plating layer 2 and each of the top surface 1*a*, the sliding surface 1*b* and the inner peripheral surface 1*c* of the piston body 1 may ease or reduce the hardness difference between the nickel plating layer 2 and each of the top surface 1*a*, the sliding surface 1*b* and the inner peripheral surface 1*c* of the piston body 1 in a case where the piston 100 is arranged under the high temperature environment equal to or greater than approximately 250° C. Thus, even in a case where the piston 100 is arranged under the high temperature environment, the nickel plating layer 2 is restrained from peeling off from the top surface 1*a*, the sliding surface 1*b* and/or the inner peripheral surface 1*c* of the piston body 1. As a result, decrease in lifetime of the piston 100 resulting from the peel-off of the nickel plating layer 2 may be restrained.

In addition, in the present embodiment, the peel-off of the nickel plating layer 2 is restrained by the reforming layer 3 so that the adhesion between the nickel plating layer 2 and each of the top surface 1*a*, the sliding surface 1*b* and the inner peripheral surface 1*c* of the piston body 1 improves. Thus, an etching process or a zinc immersion process, for example, as a pre-process may not be required for the increase of adhesion. Corrosion, for example, of the top surface 1*a*, the sliding surface 1*b* and the inner peripheral surface 1*c* of the piston body 1 made of aluminum alloy (or aluminum) may be restrained to thereby inhibit a defect of each of the top surface 1*a*, the sliding surface 1*b* and the inner peripheral surface 1*c*.

Further, in the present embodiment, the nickel plating layer 2 including a high hardness is formed to cover the top surface 1*a*, the sliding surface 1*b* and the inner peripheral surface 1*c* of the piston body 1, which may result in increase of hardness (i.e., fatigue strength) of the piston body 1. Thus, without an increase of thickness of the piston body 1, durability of the piston 100 may increase. In a case where the piston 100 is configured to include the same performance (i.e., durability) as a known piston at which the nickel plating layer 2 is not formed, the weight of the piston 100 may be reduced as compared to the known piston.

Furthermore, in the present embodiment, the Vickers hardness of the reforming layer 3 (approximately 200 HV to 400 HV) is specified to be greater than the Vickers hardness of each of the top surface 1*a*, the sliding surface 1*b* and the inner peripheral surface 1*c* of the piston body 1 (approximately 120 HV before subjected to the high temperature environment and approximately 60 HV after subjected to the high temperature environment) and to be smaller than the Vickers hardness of the nickel plating layer 2 (approximately 500 HV to 600 HV before subjected to the high temperature environment and approximately 800 HV to 1000 HV after subjected to the high temperature environment). Accordingly, the hardness difference between the reforming layer 3 and the nickel plating layer 2, and the hardness difference between each of the top surface 1*a*, the sliding surface 1*b* and the inner peripheral surface 1*c* of the piston body 1 and the reforming layer 3 may be specified to be smaller than the hardness difference between each of the top surface 1*a*, the sliding surface 1*b* and the inner peripheral surface 1*c* of the piston body 1 and the nickel plating layer 2. Consequently, the hardness difference between each of the top surface 1*a*, the sliding surface 1*b* and the inner peripheral surface 1*c* of the piston body 1, and the nickel plating layer 2 may be securely eased by the reforming layer 3.

Furthermore, in the present embodiment, the surface 3*b* of the reforming layer 3 that is in contact with the nickel plating layer 2 is formed to be rough in the concavo-convex form. Thus, as compared to a case where the surface 3*b* of the reforming layer 3 is flat (flat surface), the adhesion of the nickel plating layer 2 relative to the reforming layer 3 may increase. The nickel plating layer 2 is restrained from peeling off from the top surface 1*a*, the sliding surface 1*b* and the inner peripheral surface 1*c* of the piston body 1 (specifically, from the surface 3*b* of the reforming layer 3). In addition, because the surface 3*b* of the reforming layer 3 is in the concavo-convex form, the nickel plating layer 2 including a high adhesion performance may be easily formed at the surface 3*b* of the reforming layer 3 without the etching process or the zinc immersion process, for example, as the pre-process in a case of forming the nickel plating layer 2 at the surface 3*b* of the reforming layer 3. Further, the nickel plating layer 2 and the reforming layer 3 are closely in contact with each other so as to retrain the nickel plating layer 2 from peeling off, which is different from a case where a different or additional layer is disposed between the nickel plating layer 2 and the reforming layer 3. That is, without the etching process or the zinc immersion process as the pre-process, the surface of the reforming layer 3 facing the nickel plating layer 2, i.e., the surface 3*b*, is brought in the concavo-convex form, which may simplify processing of nickel plating and easily form the nickel plating layer 2 that includes a high adhesion performance at the surface 3*b* of the reforming layer 3.

Furthermore, in the present embodiment, the reforming layer 3 includes Ni that is embedded by the fine particle shot peening process. Because Ni serving as (or equal to) a major component of the nickel plating layer 2 is included in the reforming layer 3, the adhesion between the reforming layer 3 and the nickel plating layer 2 may further improve.

Furthermore, in the present embodiment, the concentration of Ni in the reforming layer 3 (approximately in the range of 5 wt % to 20 wt %) is specified to be smaller than the concentration of Ni in the nickel plating layer 2 (approximately in the range of 85 wt % to 96 wt %). Because of the smaller concentration of Ni in the reforming layer 3, the hardness of the reforming layer 3 is restrained from being greater than the hardness of the nickel plating layer 2.

Furthermore, in the present embodiment, the thickness t2 of the reforming layer 3 (approximately in the range of 3 μm to 10 μm) is specified to be smaller than the thickness t1 of the nickel plating layer 2 (approximately 20 μm). Thus, while the thickness of the piston 100 is restrained from increasing, the thickness t1 of the nickel plating layer 2 may be secured for increasing the hardness of the piston 100.

A manufacturing method of the piston 100, i.e., a surface treatment method, will be explained with reference to FIGS. 1 to 3.

First, Al—Si—Cu alloy (aluminum alloy) in melted state is poured into a casting mold to cast the piston body 1 (see FIG. 1) on which a surface treatment is not performed. The Vickers hardness of the piston body 1 is approximately 120 HV. Then, the fine particle shot peening process is performed on the top surface 1*a*, the sliding surface 1*b* and the inner peripheral surface 1*c* of the piston body 1 (see FIG. 1) that is removed from the casting mold.

Specifically, a blasting material formed by nickel fine particles including an average particle size of approximately 53 μm or smaller is thrown against the top surface 1*a*, the sliding surface 1*b* and the inner peripheral surface 1*c* of the piston body 1 at a blasting pressure of approximately 0.4 MPa. Accordingly, the nickel fine particles that are thrown at a high speed are embedded to the top surface 1*a*, the sliding surface 1*b* and the inner peripheral surface 1*c* of the piston body 1. As a result, as illustrated in FIG. 3, the reforming layer 3 of which properties are different from aluminum alloy is formed at the top surface 1*a*, the sliding surface 1*b* and the inner peripheral surface 1*c* of the piston body 1.

At this time, oxygen in air is embedded, together with the nickel fine particles, to the top surface 1*a*, the sliding surface 1*b* and the inner peripheral surface 10 of the piston body 1. In addition, kinetic energy of the nickel fine particles that are thrown against the top surface 1*a*, the sliding surface 1*b* and the inner peripheral surface 1*c* of the piston body 1 is converted to thermal energy. Accordingly, five elements, i.e., Al, Si and Cu constituting aluminum alloy, and Ni and O embedded by the fine particle shot peening process, are alloyed, for example, to form the composite structure 3*a* within the reforming layer 3 as illustrated in FIG. 3. Further, in a case where the nickel fine particles are embedded, grain refinement of the aluminum alloy is obtained in the reforming layer 3.

Because the nickel fine particles are thrown against the top surface 1*a*, the sliding surface 1*b* and the inner peripheral surface 1*c* of the piston body 1 in an irregular manner, the surface 3*b* of the reforming layer 3 is formed to be rough in the concavo-convex form (rough and uneven surface) and the thickness t2 of the reforming layer 3 is made uneven. The Vickers hardness of the reforming layer 3 is approximately 200 HV to 400 HV, and the thickness t2 of the reforming layer 3 is approximately in the range of 3 μm to 10 μm.

According to the manufacturing method in the embodiment, because of the fine particle shot peening process applied to the top surface 1*a*, the sliding surface 1*b* and the inner peripheral surface 1*c* of the piston body 1, the reforming layer 3 including the surface 3*b* serving as the rough surface in the concavo-convex form is formed at or formed over the top surface 1*a*, the sliding surface 1*b* and the inner peripheral surface 1*c* of the piston body 1. The reforming layer 3 may be easily formed at the top surface 1*a*, the sliding surface 1*b* and the inner peripheral surface 1*c* of the piston body 1 and be easily formed in the concavo-convex form.

Afterwards, the electroless nickel plating process is performed at the entire piston body 1 where the reforming layer 3 is formed at the top surface 1*a*, the sliding surface 1*b* and the inner peripheral surface 1*c*.

Specifically, as the pre-process, a degreasing process for removing grease on the surface of the piston body 1, a washing processing, an acid dipping processing for removing impurities at the surface of the piston body 1 by acid, and a washing processing are performed.

Because the surface 3*b* of the reforming layer 3 is formed in the rough surface by including the concavo-convex form, the adhesion between the reforming layer 3 and the nickel plating layer 2 is enhanced. Thus, according to the manufacturing method of the present embodiment, as being different from a conventional electroless nickel plating process relative to aluminum alloy, the etching process for causing each of the top surface 1*a*, the sliding surface 1*b* and the inner peripheral surface 1*c* of the piston body 1 to include the concavo-convex form or the zinc immersion process for substituting zinc (Zn) to nickel (Ni), for example, are not necessary as the pre-process. As a result, corrosion, for example, of the surface of the piston body 1 that leads to a flaw or defect may be restrained. In addition, as compared to the conventional electroless nickel plating process, the pre-process of the embodiment may be greatly simplified.

Afterwards, a main process (electroless nickel plating process) is performed. Specifically, an electroless nickel plating bath mainly made of Ni—P alloy is prepared so that the piston body 1 is immersed for a predetermined time period in the electroless nickel plating bath that is maintained at a predetermined temperature. As a result, the nickel plating layer 2 (see FIG. 2) that is amorphous or non-crystalline is formed entirely at the surface of the piston body 1 that includes the surface 3*b* of the reforming layer 3. The nickel plating layer 2 is made of Ni—P alloy that contains Ni substantially in a range of 85 wt % to 96 wt % and P substantially in a range of 4 wt % to 15 wt %. Because the nickel plating layer 2 is amorphous, the Vickers hardness of the nickel plating layer 2 is approximately 500 HV. The piston body 1 is thereafter taken from the electroless nickel plating bath to be dried. An immersion condition of the electroless nickel plating process is adjusted or controlled so that the thickness t1 of the nickel plating layer 2 is equal to approximately 20 μm.

According to the manufacturing method of the embodiment, the nickel plating layer 2 is formed by the electroless plating process. Thus, as compared to a case where the nickel plating layer 2 is formed by an electroplating process, the nickel plating layer 2 including the substantially uniform thickness t1 may be easily formed regardless of the configuration of the piston body 1.

Afterwards, as a post-process, a heat treatment is performed on the piston body 1 for a predetermined time period at a temperature condition of approximately 200° C. By the heat treatment, while hardness (i.e., strength) of aluminum alloy that constitutes the piston body 1 is restrained from decreasing, the structure of the amorphous nickel plating layer 2 is crystallized to a certain extent. The Vickers hardness of the nickel plating layer 2 increases from approximately 500 HV to approximately 500 HV to 600 HV. On the other hand, the Vickers hardness of the reforming layer 3 (approximately 200 HV to 400 HV) and the Vickers hardness of the piston body 1 (approximately 120 HV) do not change a lot. Accordingly, the surface treatment on each of the top surface 1*a*, the sliding surface 1*b* and the inner peripheral surface 1*c* of the piston body 1 is completed to thereby manufacture and obtain the piston 100 as illustrated in FIG. 1.

Next, a confirmation test that was conducted to confirm an effect of the aforementioned embodiment will be explained with reference to FIGS. 2, 4 to 6. Specifically, a rotary bending test, a hardness distribution measurement, and an elemental analysis which were performed as the confirmation test will be explained.

Details of the rotary bending test will be explained first. In the rotary bending test, test pieces made of Al—Si—Cu alloy (aluminum alloy) were prepared. Each of the test pieces was formed to include configurations and dimensions so as to conform to Japanese Industrial Standard (JIS) Z 2274 related to the rotary bending test. The surface treatment was then conducted on one of the test pieces in the same way as the surface treatment conducted on the top surface 1*a*, the sliding surface 1*b* and the inner peripheral surface 1*c* of the piston body 1 in the aforementioned embodiment (see FIG. 2). Specifically, in the same way as the aforementioned embodiment, the fine particle shot peening process utilizing nickel fine particles was performed on the substantially entire surface of the test piece. Then, the electroless nickel plating process in the same way as the aforementioned embodiment was performed so as to cover the entire test piece on which the fine particle shot peening process had been conducted. That is, after the degreasing processing, the washing processing, the acid dipping processing, and the washing processing were performed as the pre-process, the main process, i.e., the electroless nickel plating process was conducted. Thereafter the heat treatment at 200° C. was performed as the post-process. The test piece where the reforming layer and the nickel plating layer were formed at the surface of aluminum alloy was prepared as a present example 1 corresponding to the aforementioned embodiment.

As a comparative example 1 relative to the present example 1, the test piece was prepared in a different manner from the test piece for the present example 1. Specifically, the electroless nickel plating process was performed but the fine particle shot peening process was not conducted on the test piece for the comparative example 1. In this case, as the pre-process of the electroless nickel plating process, an abrasion processing, a washing processing, a degreasing processing, a washing processing, an etching processing, a washing processing, an acid dipping processing, a washing processing, a first zinc immersion processing, an acid dipping processing, a washing processing, a second zinc immersion processing, and a washing processing were performed. That is, in addition to the pre-process of the present example 1, nine pieces of processing (abrasion, washing, etching, washing, first zinc immersion, acid dipping, washing, second zinc immersion and washing) were conducted. The abrasion processing involves polishing the surface of the test piece. The etching processing involves forming the surface of the test piece to be rough in a fine concavo-convex form. The first zinc immersion processing, the acid dipping processing, the washing processing, and the second zinc immersion processing involve forming zinc plating that is replaceable by Ni at the surface of the test piece. In the same way as the present example 1, the main process (electroless nickel plating process) and the post-process (heat treatment at 200° C.) were performed on the test piece. Accordingly, the test piece at which the nickel plating layer was formed at the surface of aluminum alloy was prepared as the comparative example 1 relative to the present example 1.

In addition, in a comparative example 2 relative to the present example 1, the test piece was prepared in a different manner from the test piece for the present example 1. Specifically, the electroless nickel plating process was not performed but the fine particle shot peening process was performed on the test piece for the comparative example 2. That is, the test piece at which the reforming layer was formed at the surface of aluminum alloy was prepared as the comparison example 2 relative to the present example 1. Further, a comparative example 3 relative to the present example 1 was prepared in a different manner from the test piece for the present example 1. Specifically, neither the electroless nickel plating process nor the fine particle shot peening process was performed on the test piece for the comparative example 3, i.e., the test piece of the comparative example 3 was untreated.

The test pieces of the present example 1, the comparative examples 1 to 3 were heated (i.e., heat treatment was conducted) at 250° C. for 100 hours so that the aforementioned test pieces were arranged under the high temperature environment. Then, as the rotary bending test, a rotary bending force was repeatedly applied to each of the test pieces of the present example 1, the comparative examples 1 to 3 so as to obtain cycle numbers taken for breakage of each of the test pieces as fatigue strength. The fatigue strength tends to increase in direct proportion to tensile strength while the hardness tends to increase in direct proportion to tensile strength. Thus, in a case of high hardness, the fatigue strength tends to increase.

Figure 4:
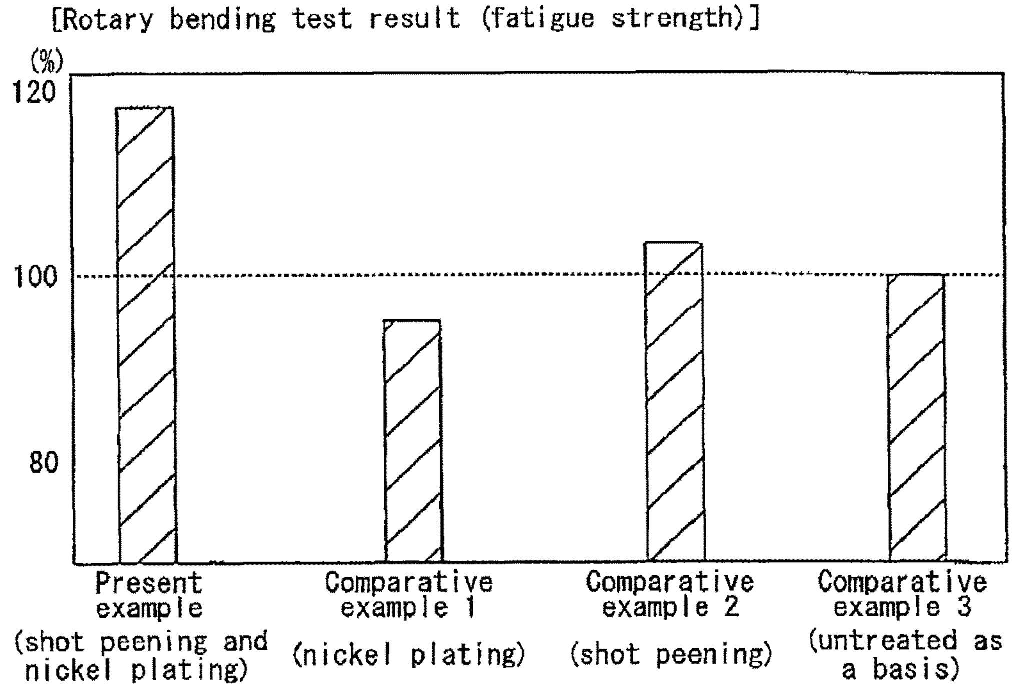
FIG. 4 is a graph illustrating a rotary bending test result according to the embodiment.

A percentage of the cycle numbers of each of the present example 1, the comparative examples 1 and 2 based on the cycle numbers of the comparative example 3 serving as 100% is illustrated in FIG. 4. According to results of the rotary bending test as illustrated in FIG. 4, the cycle numbers of the test piece of the present example 1 is greater than the cycle numbers of the test piece of the comparative example 3 (i.e., the untreated test piece) by approximately 20%. That is, the fatigue strength of the test piece of the present example 1 is greatly higher than the fatigue strength of the test piece of the comparative example 3 (the untreated test piece). On the other hand, the cycle numbers of the test piece of the comparative example 1 is smaller than the fatigue strength of the test piece of the comparative example 3 (the untreated test piece) by approximately 5%. That is, the fatigue strength of the test piece of the comparative example 1 is slightly smaller than the fatigue strength of the test piece of the comparative example 3 (the untreated test piece). Further, the cycle numbers of the test piece of the comparative example 2 is slightly greater than the fatigue strength of the test piece of the comparative example 3 (the untreated test piece). That is, the fatigue strength of the test piece of the comparative example 2 is slightly higher than the fatigue strength of the test piece of the comparative example 3 (the untreated test piece). Accordingly, it is clarified that the hardness of the test piece of the present example 1 corresponding to the aforementioned embodiment greatly increases as compared to the test pieces of the comparative examples 1 and 2.

In a case where the test piece of the present example 1 was arranged under the high temperature environment, the hardness difference between the surface of aluminum alloy and the nickel plating layer was eased by the reforming layer disposed between the surface of aluminum alloy and the nickel plating layer even with the increase of hardness difference between the surface of aluminum alloy and the nickel plating layer. It is considered, therefore, that the peel-off of the nickel plating layer, for example, did not occur. Further, it is considered that the nickel plating layer in the test piece of the present example 1 was crystallized in a state where the test piece was arranged under the high temperature environment, which resulted in increase of hardness of the surface of the test piece. Consequently, as compared to the test piece of the comparative example 2 where the nickel plating layer is not formed, the hardness of the test piece of the present example 1 is considered to greatly increase.

The reason why the fatigue strength of the test piece of the comparative example 1 was lower than the untreated test piece is considered as follows: in a case where the test piece of the comparative example 1 was arranged under the high temperature environment, the hardness difference between the surface of aluminum alloy and the nickel plating layer in the test piece increased and thus a portion of the nickel plating layer peeled off from the surface of aluminum alloy. At this time, because of a defect resulting from corrosion, for example, which occurred at the surface of aluminum alloy during the pre-process such as the etching process and the zinc immersion process, for example, a crack that was initiated from the aforementioned defect portion at the surface where aluminum alloy was exposed proceeded. As a result, it is considered that the fatigue strength of the test piece of the comparative example 1 decreased as compared to the fatigue strength of the untreated test piece of the comparative example 3 where the nickel plating layer was not formed.

Next, details of the hardness distribution measurement will be explained. For the hardness distribution measurement, test pieces made of Al—Si—Cu alloy (aluminum alloy) were prepared. The fine particle shot peening process and the electroless nickel plating process were performed on each of the test pieces in the same way as the test piece of the present example 1 for the rotary bending test. As a result, the test pieces at each of which the reforming layer and the nickel plating layer were formed at the surface of aluminum alloy were obtained.

One of the aforementioned test pieces was arranged at the high temperature environment by being heated at 250° C. for 100 hours (i.e., the heat treatment was performed) so as to obtain the test piece of a present example 2. Then, micro-hardness (micro-Vickers hardness) was measured on the test piece of the present example 2 and the test piece of a present example 3 at which the aforementioned heat treatment was not conducted (i.e., not arranged under the high temperature environment). Specifically, each of the test pieces of the present example 2 and the present example 3 was cut along a thickness direction (i.e., depth direction) thereof from the surface exposed to the outside of the nickel plating layer towards the aluminum alloy so that each of the test pieces of the present example 2 and the present example 3 was divided into two portions. Specifically, two test pieces for the present example 2 (i.e., for present examples 2-1 and 2-2) and two test pieces for the present example 3 (i.e., for present examples 3-1 and 3-2) are obtained. The Vickers hardness was then obtained at each of cross sections of the cut and divided test pieces of the present examples 2-1 and 2-2, and the present examples 3-1 and 3-2. An indenter for measuring microhardness was pressed against plural positions along the depth direction at each of the cross sections at a load of 10 gf. The Vickers hardness was obtained on a basis of a surface area of each dent formed and obtained by the pressing of the indenter.

Figures 5, 6:
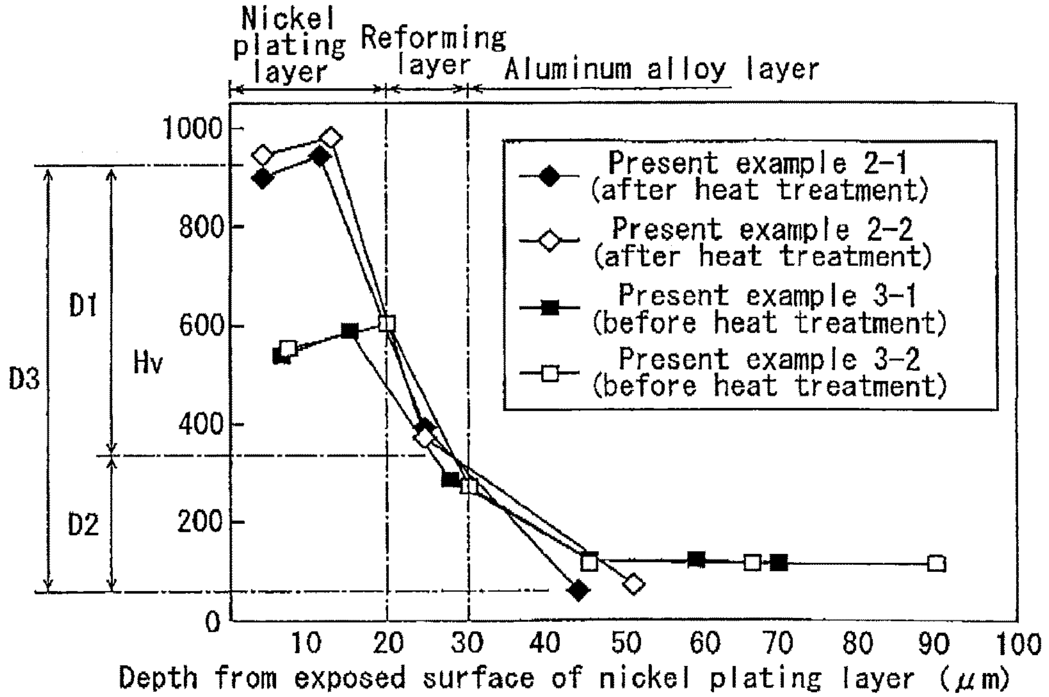
FIG. 5 is a graph illustrating a hardness distribution measurement result according to the embodiment.
FIG. 6 is a graph illustrating an elemental analysis result according to the embodiment.

Values of Vickers hardness obtained at the plural positions along the depth direction at each of the cross sections of the test pieces of the present examples 2-1, 2-2, 3-1, and 3-2 are shown in FIG. 5. From results of the hardness distribution measurement in FIG. 5, in the nickel plating layer, the Vickers hardness of the present example 2 (the present examples 2-1 and 2-2) which was arranged under the high temperature environment is approximately 800 HV to 1000 HV that is approximately 1.5 times or more as large as the Vickers hardness of the present example 3 (the present examples 3-1 and 3-2) (approximately 500 HV to 600 HV) which was not arranged under the high temperature environment. That is, it is confirmed that the hardness of nickel plating layer increases (i.e., nickel plating layer is hardened) in a case where the nickel plating layer is disposed under the high temperature environment. In addition, in the aluminum alloy (aluminum alloy layer), the Vickers hardness of the present example 2 (the present examples 2-1 and 2-2) which was arranged under the high temperature environment is approximately 60 HV that is approximately a half of the Vickers hardness of the present example 3 (the present examples 3-1 and 3-2) (approximately 120 HV) which was not arranged under the high temperature environment. That is, it is confirmed that the hardness of the surface of aluminum alloy (aluminum alloy layer) decreases (i.e., the surface of aluminum alloy is softened) in a case where the aluminum alloy is disposed under the high temperature environment.

In the reforming layer, the Vickers hardness of the present example 2 which was arranged under the high temperature environment and the Vickers hardness of the present example 3 which was not arranged under the high temperature environment were not greatly different and were approximately 200 HV to 400 HV. Accordingly, it is confirmed that the hardness of reforming layer is not greatly changed even in a case where the reforming layer is disposed under the high temperature environment. As a result, a hardness difference D1 between the reforming layer and the nickel plating layer and a hardness difference D2 between the surface of aluminum alloy and the reforming layer are both smaller than a hardness difference D3 between the surface of aluminum alloy and the nickel plating layer. It is thus confirmed that the hardness difference between the surface of aluminum alloy and the nickel plating layer is eased by the reforming layer in a case where the nickel plating layer, the reforming layer, and the aluminum alloy layer are disposed under the high temperature environment.

Next, details of the elementary analysis will be explained. In the elementary analysis, in the same way as the hardness distribution measurement, a test piece at which the reforming layer and the nickel plating layer are formed at the surface of aluminum alloy was cut along the thickness direction and the measurement was conducted at a cross section. At this time, common Field Emission-Scanning Electron Microscope and Energy Dispersive X-ray Spectrometry (FE-SEM/EDX) were used as measurement devices. Specifically, while the aluminum alloy layer, the reforming layer, and the nickel plating layer at the cross section of the test piece were observed by FE-SEM, a composition at each predetermined measurement position was measured by EDX. At this time, three measurement positions, i.e., positions 1, 2 and 3 at each of the aluminum alloy layer, the reforming layer, and the nickel plating layer were measured.

FIG. 6 shows results of the elemental analysis. As shown in FIG. 6, the nickel plating layer contains Ni in a range of 86 wt % to 88 wt % and the reforming layer contains Ni in a range of 8 wt % to 17 wt %. Accordingly it is confirmed that the concentration of Ni in the nickel plating layer is greater than the concentration of Ni in the reforming layer. Ni in the reforming layer is considered to originate from nickel fine particles embedded by the fine particle shot peening process. In the reforming layer, in addition to Al, Si, and Cu which originate from aluminum alloy, oxygen (O) in a range of 3 wt % to 8 wt % was contained. It is considered that oxygen in the reforming layer was obtained by a reaction of enzyme molecule embedded together with the nickel fine particles with other elements by heat or impact during the fine particle shot peening process, for example.

Further, in the reforming layer, a composition ratio greatly changed depending on the measurement positions. This is considered as resulting from uneven embedding of nickel fine particles in the fine particle shot peening process.

The present embodiment is an example and is not limited to the aforementioned configurations. The embodiment may be appropriately modified or changed, for example, in the following way.

For example, the present embodiment is applied to the piston 100 that is provided at an internal combustion engine for a vehicle. Alternatively, the present embodiment is applicable to a cylinder or a connecting rod each of which serves as the mechanical component of the internal combustion engine. In such case, the present embodiment may be applied to a surface of the cylinder facing a combustion chamber, or a sliding surface of the cylinder or the connecting rod, for example. Further alternatively, the present embodiment may be applied to a mechanical component for a device or an apparatus other than the internal combustion engine. For example, the present embodiment may be applied to a rotary shaft of an electric motor. Further alternatively, the present embodiment may be applied to a mechanical component that is arranged under a high temperature environment.

In the present embodiment, the reforming layer 3 and the nickel plating layer 2 are formed at each of the top surface 1*a*, the sliding surface 1*b*, and the inner peripheral surface 1*c* of the piston body 1. Alternatively, the reforming layer 3 and the nickel plating layer 2 may be formed at one of or two of the top surface 1*a*, the sliding surface 1*b*, and the inner peripheral surface 1*c* of the piston body 1. In addition, for example, the reforming layer 3 and the nickel plating layer 2 may be formed at other portions or positions than the top surface 1*a*, the sliding surface 1*b*, and the inner peripheral surface 1*c* of the piston body 1, i.e., may be formed at a rear surface of the top surface 1*a* of the piston body 1. Further alternatively, the reforming layer 3 and the nickel plating layer 2 may be formed over an entire surface of the piston body 1.

In the present embodiment, the reforming layer is formed by the fine particle shot peening process in which nickel fine particles are embedded. At this time, fine particles used for the fine particle shot peening process are not limited to the nickel fine particles. For example, iron fine particles may be used in the fine particle shot peening process. As a result, the fine particle shot peening process may be performed at a reduced cost as compared to a case where the nickel fine particles are used. In addition, the reforming layer may be formed by shot peening process in which large particles each including an average particle size of 0.2 mm or greater are utilized instead of fine particles. Further, the nickel fine particles may not be embedded to the surface of the predetermined portion of the piston body 1. Even in such case, because of the nickel fine particles that are projected, grain refinement of the aluminum alloy (aluminum alloy layer) is obtained at a portion where the nickel fine particles are projected to thereby reform the surface of the predetermined portion of the piston body 1. Without the embedding of the nickel fine particles, the reforming layer may be formed accordingly.

In the present embodiment, the piston body 1 is made of Al—Si—Cu alloy (aluminum alloy). Alternatively, the piston body 1 may be made of other aluminum alloy than Al—Si—Cu alloy. For example, the piston body 1 may be made of Al—Cu—Ni—Mg alloy or high-silicon aluminum alloy. Further alternatively, the piston body 1 may be made of A1000 series aluminum material (pure aluminum material).

In the present embodiment, the nickel plating layer 2 is formed by the electroless nickel plating process. Alternatively, the nickel plating layer 2 may be formed by an electrolytic nickel plating process.

According to the embodiment, a mechanical component for an internal combustion engine (the piston 100) includes the mechanical component body (the piston body 1) used for the internal combustion engine and including an aluminum portion that is made of one of aluminum and aluminum alloy, the nickel plating layer 2 formed to cover the surface of the predetermined portion (the top surface 1*a*, the sliding surface 1*b* and the inner peripheral surface 1*c*) at the aluminum portion of the mechanical component body (the piston body 1), and the reforming layer 3 formed between the surface of the predetermined portion (the top surface 1*a*, the sliding surface 1*b* and the inner peripheral surface 1*c*) at the aluminum portion of the mechanical component body (the piston body 1) and the nickel plating layer 2. Accordingly, because of the reforming layer 3 disposed between the surface of the predetermined portion (the top surface 1*a*, the sliding surface 1*b* and the inner peripheral surface 1*c*) at the aluminum portion of the mechanical component body (the piston body 1) and the nickel plating layer 2, the hardness difference between the surface of the predetermined portion (the top surface 1*a*, the sliding surface 1*b* and the inner peripheral surface 1*c*) at the aluminum portion and the nickel plating layer 2 in a case where the mechanical component (the piston 100) is arranged under the high temperature environment may be eased or reduced by the reforming layer 3 formed between the surface of the predetermined portion (the top surface 1*a*, the sliding surface 1*b* and the inner peripheral surface 1*c*) at the aluminum portion and the nickel plating layer 2. Therefore, even in a case where the mechanical component (the piston 100) is arranged under the high temperature environment, the nickel plating layer 2 is restrained from peeling off from the surface of the predetermined portion (the top surface 1*a*, the sliding surface 1*b* and the inner peripheral surface 1*c*) at the aluminum portion. As a result, decrease in lifetime of the mechanical component (the piston 100) resulting from the peel-off of the nickel plating layer 2 may be restrained. In addition, the peel-off of the nickel plating layer 2 is restrained by the reforming layer 3 so that the adhesion between the nickel plating layer 2 and the surface of the predetermined portion (the top surface 1*a*, the sliding surface 1*b* and the inner peripheral surface 1*c*) at the aluminum portion improves. Thus, the etching process or the zinc immersion process, for example, as the pre-process may not be required for the increase of adhesion. Corrosion, for example, of the surface of the predetermined portion (the top surface 1*a*, the sliding surface 1*b* and the inner peripheral surface 1*c*) at the aluminum portion made of aluminum alloy or aluminum may be restrained to thereby inhibit a defect of the surface of the predetermined portion (the top surface 1*a*, the sliding surface 1*b* and the inner peripheral surface 1*c*) at the aluminum portion. Further, the nickel plating layer 2 including a high hardness is formed to cover the surface of the predetermined portion (the top surface 1*a*, the sliding surface 1*b* and the inner peripheral surface 1*c*) at the aluminum portion, which may result in increase of hardness (i.e., fatigue strength) of the mechanical component (the piston 100). Without an increase of thickness of the mechanical component body (the piston body 1), durability of the mechanical component (the piston 100) may increase. In a case where the mechanical component (the piston 100) is configured to include the same performance (i.e., durability) as a known mechanical component for an internal combustion engine at which the nickel plating layer 2 is not formed, the weight of the mechanical component (the piston 100) may be reduced as compared to the known mechanical component.

According to the present embodiment, the hardness of the reforming layer 3 is specified to be greater than the hardness of the surface of the predetermined portion of the mechanical component body (each of the top surface 1*a*, the sliding surface 1*b* and the inner peripheral surface 1*c* of the piston body 1) and to be smaller than the hardness of the nickel plating layer 2.

In addition, the surface 3*b* of the reforming layer 3 facing the nickel plating layer 2 includes a concavo-convex form.

Further, the reforming layer 3 includes nickel.

Furthermore, the concentration of nickel included in the reforming layer 3 is specified to be smaller than the concentration of nickel included in the nickel plating layer 2.

Furthermore, the mechanical component body at which the reforming layer 3 is formed includes the piston body 1 and the surface of the predetermined portion of the mechanical component body includes the top surface 1*a* of the piston body 1.

Furthermore, the nickel plating layer 2 is formed to contact with the surface 3*b* of the reforming layer 3 facing the nickel plating layer 2.

Furthermore, a step of forming the reforming layer 3 on the top surface 1*a*, the sliding surface 1*b* and the inner peripheral surface 1*c* of the piston body 1 that is made of one of aluminum and aluminum alloy by a shot peening process performed on the top surface 1*a*, the sliding surface 1*b* and the inner peripheral surface 1*c* of the piston body 1, the step of forming the reforming layer 3 includes a step of forming the reforming layer 3 that includes nickel and the concavo-convex form on the top surface 1*a*, the sliding surface 1*b* and the inner peripheral surface 1*c* of the piston body 1 by a fine particle shot peening process utilizing nickel and performed on the top surface 1*a*, the sliding surface 1*b* and the inner peripheral surface 1*c* of the piston body 1.

Furthermore, the hardness of the reforming layer 3 is specified to be greater than the hardness of each of the top surface 1*a*, the sliding surface 1*b* and the inner peripheral surface 1*c* of the piston body 1 and to be smaller than the hardness of the nickel plating layer 2.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A manufacturing method of a mechanical component for an internal combustion engine, the manufacturing method of comprising steps of:

forming a reforming layer that includes nickel and a concave-convex form on a surface of a predetermined portion of a mechanical component body that is made of one of aluminum and aluminum alloy by a fine particle shot peening process utilized nickel and performed on the surface of the predetermined portion of the mechanical component body, the nickel in the reforming layer being embedded by the fine particle shot peening process; and forming a nickel plating layer to cover the surface of the predetermined portion of the mechanical component body at which the reforming layer is formed;

a hardness of the reforming layer is specified to be greater than a hardness of the surface of the predetermined portion of the mechanical component body and to be smaller than a hardness of the nickel plating layer, and the hardness of the reforming layer is in a range of 200 HV to 400 HV, wherein a concentration of nickel embedded by the fine particle shot peening process is within a range of 5 wt % to 20 wt %.

2. The manufacturing method according to claim 1, wherein a concentration of nickel included in the nickel plating layer is within a range of 85 wt % to 96 wt %.

3. The manufacturing method according to claim 2, wherein a thickness of the reforming layer is in the range of 3 μm to 10 μm.

4. The manufacturing method according to claim 1, wherein the fine particle shot peening process embeds oxygen with the nickel into the reforming layer.

* * * * *